Dec. 30, 1958  I. T. RADA ET AL  2,866,334
APPARATUS FOR TESTING DOUGHS

Filed Jan. 27, 1955  9 Sheets-Sheet 1

Fig. 1.

INVENTORS
ISTVAN TAMAS RADA
AND JENO FERENCZY
BY
Robert H. Jacob
AGENT

Dec. 30, 1958　　　I. T. RADA ET AL　　　2,866,334
APPARATUS FOR TESTING DOUGHS
Filed Jan. 27, 1955　　　　　　　　　　　　9 Sheets-Sheet 2

Fig. 2.

INVENTORS
ISTVAN TAMAS RADA
BY AND JENO FERENCZY
Robert K. Jacob
AGENT

Dec. 30, 1958     I. T. RADA ET AL     2,866,334
APPARATUS FOR TESTING DOUGHS
Filed Jan. 27, 1955     9 Sheets-Sheet 3

Fig. 3.

INVENTORS
ISTVAN TAMAS RADA
AND JENO FERENCZY
BY
Robert H. Jacob
AGENT

Dec. 30, 1958  I. T. RADA ET AL  2,866,334
APPARATUS FOR TESTING DOUGHS
Filed Jan. 27, 1955  9 Sheets-Sheet 4

INVENTORS
ISTVAN TAMAS RADA
AND JENO FERENCZY
BY
Robert H. Jacob
AGENT

Dec. 30, 1958     I. T. RADA ET AL     2,866,334
APPARATUS FOR TESTING DOUGHS Filed Jan. 27, 1955     9 Sheets—Sheet 5

INVENTOR.
ISTVAN TAMAS RADA
AND JENO FERENCZY
BY
Robert H. Jacob.
AGENT

Fig. 7.

Dec. 30, 1958  I. T. RADA ET AL  2,866,334
APPARATUS FOR TESTING DOUGHS
Filed Jan. 27, 1955  9 Sheets-Sheet 7

INVENTOR.
ISTVAN TAMAS RADA
BY AND JENO FERENCZY

Robert H. Jacob
AGENT

United States Patent Office 2,866,334
Patented Dec. 30, 1958

2,866,334

APPARATUS FOR TESTING DOUGHS

István Tamás Rada and Jenö Ferenczy, Budapest, Hungary, assignors to Licencia Talalmanyokat Ertekesito Vallalat, Budapest, Hungary Application January 27, 1955, Serial No. 484,526

Claims priority, application Hungary January 11, 1954

7 Claims. (Cl. 73—169)

This invention relates to apparatus for serially testing materials such as doughs, polymers, etc. which may be rendered jelly-like by means of kneading.

Such apparatus are chiefly known as dough testing devices and are intended for determining the quality of the jelly-like material obtained by kneading flour with water. The most usual devices of this type are arranged to perform their function by subjecting a specimen of the dough to tension. The common shortcoming of all such prior apparatus is that the specimen is prepared at normal room temperatures in a special machine, and subsequently accommodated in a suitable portion of the testing apparatus. Under these circumstances the known devices have the drawback that the conditions under which the specimen is prepared are not necessarily identical and thus a reliable serial testing cannot be performed. Further, the prior art devices usually require pugging the specimen by hand into a suitable portion of the apparatus, which is not only a time consuming operation but also constitutes a source of error, since the warmth and moisture of the hand as well as the kneading action exerted on the specimen in the course of pugging it influences the quality of the dough in an uncontrollable manner. By these and other shortcomings the quality testing of flours in series has been rendered cumbersome and, at the same time, the accuracy of the test results has been disadvantageously influenced.

The aforesaid drawbacks have been eliminated by the instant invention, in accordance with which an apparatus has been constructed in which the quality testing of materials capable of being rendered jelly-like, particularly of various flours, can be performed in series with test specimens prepared under always similar conditions, so that comparable and reliable test results may be obtained by means of serial testing. The inventive apparatus comprises, in accordance with the main feature of the invention, in combination, common kneading means, common tensile testing means, a plurality of interchangeable individual receptacle means, each enclosing a chamber for receiving a tensile test specimen of the material to be tested, and forming a counter-part of said common kneading means and said common tensile testing means, respectively, and conveyor means for intermittently advancing said individual receptacle means to said common kneading means and said common tensile testing means, seriatim. As will hereinafter be described, by the use of interchangeable individual receptacle means the gel arrives together with the individual receptacle means to the common tensile testing means so that touching of the gel by hand may be obviated; the individual receptacle means being intermittently advanced from the common kneading means to the common tensile testing means. A plurality of interchangeable individual receptacle means may be used simultaneously, whereby the serial testing is rendered considerably quicker.

Further features of the invention will be described by reference to the accompanying drawings in which.

Figure 1:
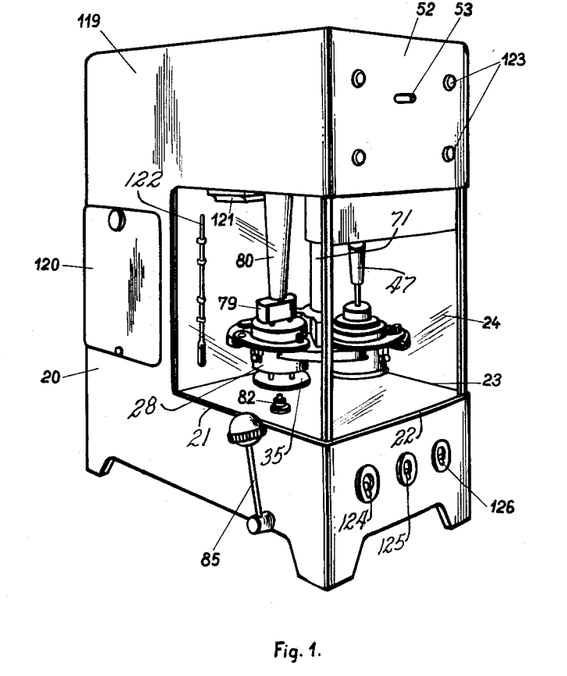
Figs. 1 and 2 represent perspective views of an embodiment of the apparatus for testing various flours, the views being taken from opposite sides.
Figure 2:
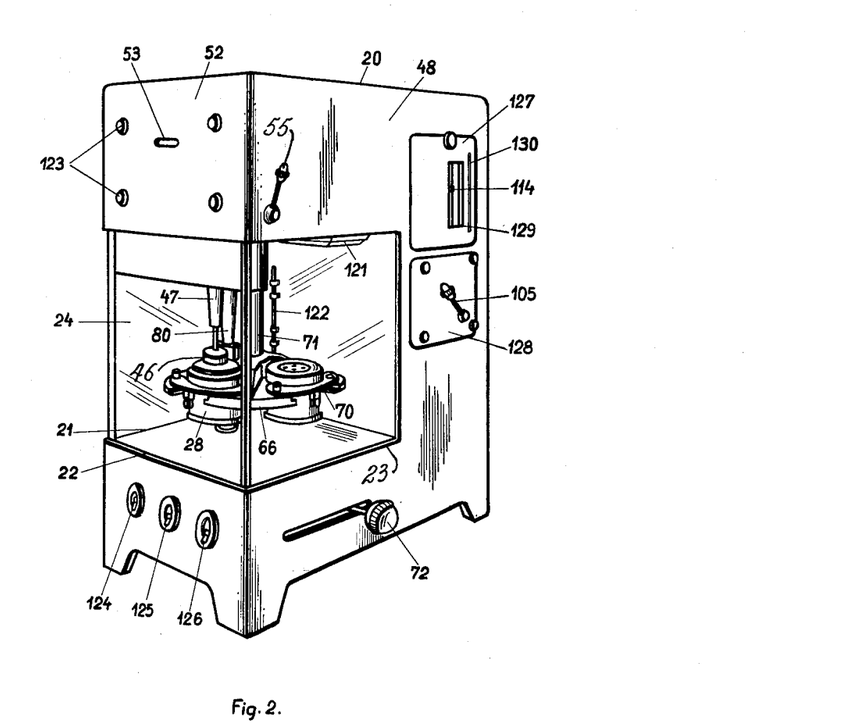
Figure 3:
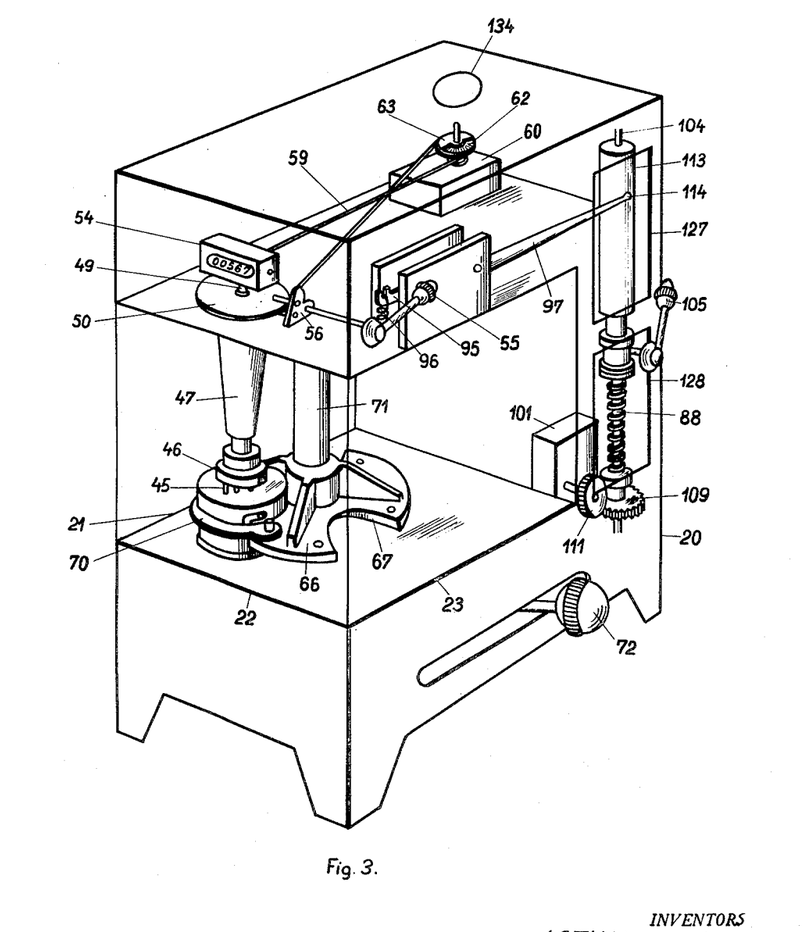
Fig. 3 is a phantom perspective view showing the arrangement of the internal components of the apparatus.

Referring to the drawings, the apparatus shown in Figs. 1 to 3 has a housing 20 with wall portions 21, 22, 23 made of transparent material such as glass. The housing 20 defines a test chamber 24 which includes common kneading means and common tensile testing means. To provide ready access to the kneading and tensile testing means, the wall portions 22 and 23 are capable of being opened in a manner not represented in the drawing.

Figure 4:
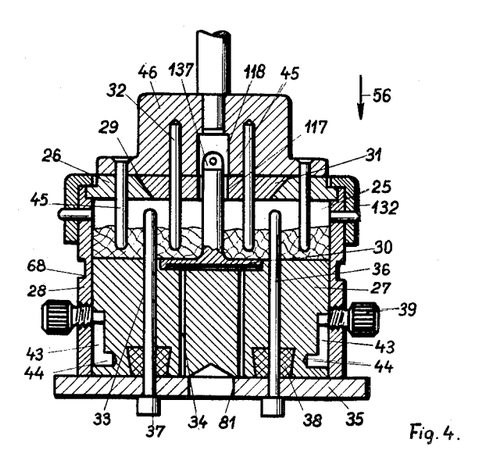
Figs. 4 and 5 illustrate a longitudinal sectional view and a plain view, respectively, of an embodiment of an individual receptacle means adapted for being applied in the apparatus shown in Figs. 1 to 3.
Figure 5:
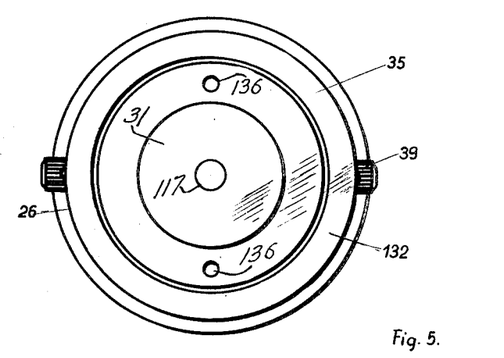
Figure 6:
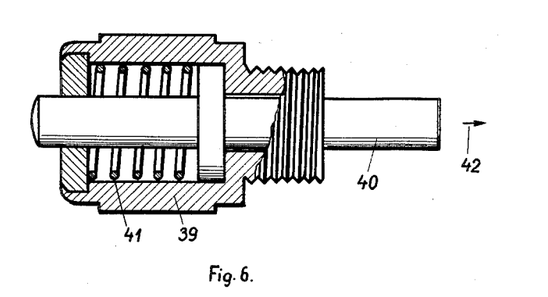
Fig. 6 is a longitudinal sectional view of a detail.
Figure 7:
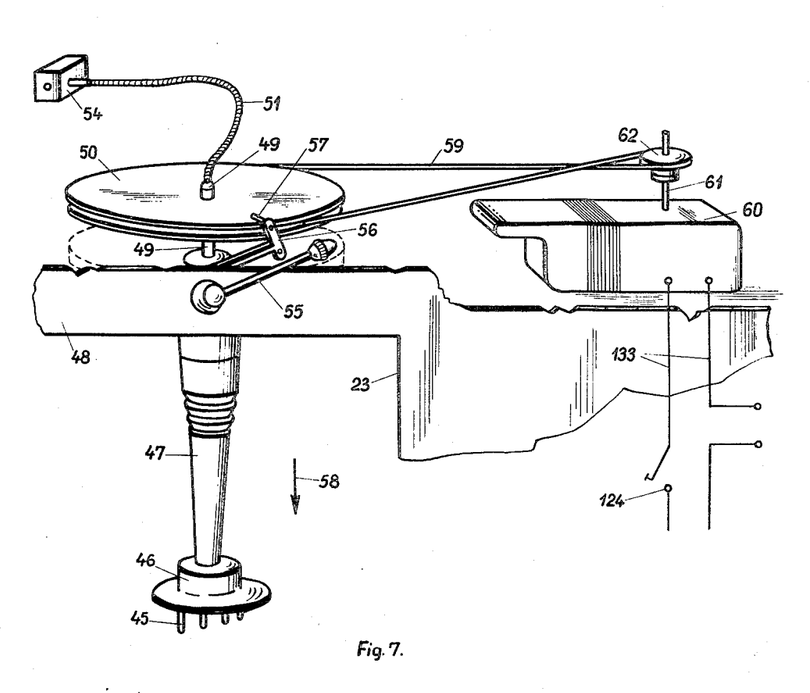
Fig. 7 is a perspective view of an embodiment of the common kneading means, with parts broken away to show the driving means therefor.
Figure 8:
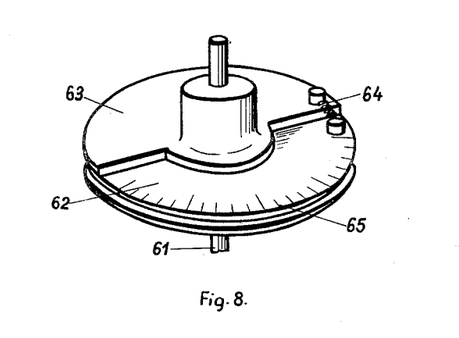
Figs. 8 and 9 illustrate a perspective view and a side elevational view, respectively, of a detail.
Figure 9:
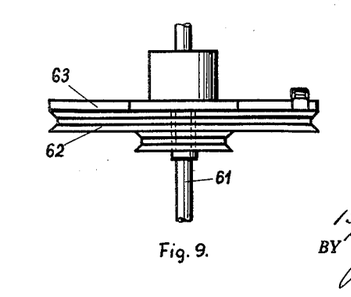

The common kneading means is illustrated in Figs. 4 to 9 and has a drive means with a kneading head shown in Fig. 7 and an elastic coupling illustrated in Figs. 8 and 9. The cooperating counter-part of the kneading means is formed by individual receptacle means, the details of which are shown in Figs. 4 and 5. Said receptacle means has a chamber 25 enclosed by a draw plate 26, a bottom portion 27 and a mantle portion 28. The draw plate 26 of the receptacle means is provided with a draw hole 29 for drawing the test specimen therethrough by means of an individual tension head means 30, in a manner described subsequently. The tension head 30 fits into a recess in the bottom portion 27 so that its top is flush with the upper surface of member 27. The draw plate 26 is rotatably arranged with respect to the mantle portion 28 and has an insert 31 accommodated therein so as to close the draw hole 29. Thus, the draw plate 26 with the insert 31 accommodated therein form a lid portion 26, 31 of the individual receptacle means 26, 27, 28, 31. The bottom portion 27 thereof is formed as a piston member snugly arranged within the mantle portion 28. The lid portion 26, 31 and the piston member 27 are provided with first passages 32 and second passages 33, respectively, through which removable kneading organs to be described hereinafter may be passed into the chamber 25 of the individual receptacle means. The individual tension head means 30 is formed with a cavity facing the piston member 27 so as to form an interstice therewith, air ducts 34 being provided in the piston member 27 for communication of the cavity of the tension head means 30 with the ambient atmosphere. The air ducts 34 prevent the forming of vacuum below the tension head means 30 when, with breaking of the test specimen, it is lifted from the piston member 27. A bottom plate 35 arranged on the mantle portion 28 opposite to the lid portion 26, 31 serves to retain stationary kneading organs 36 formed by set bolts 36 with heads 37 on their extremities protruding from the bottom plate 35 and adapted to penetrate through the second passages 33 into the chamber 25. The kneading organs 36 have shanks which closely fit into resilient inserts 38 of the bottom portion 27. The individual receptacle means 26, 27, 28, 31 is provided with means for automatically fixing the relative positions of the bottom or piston portion 27 and the mantle portion 28 associated with maximum and minimum values, respectively, of the chamber 25. With the represented embodiment, these automatic fixing means are formed by buttons 39, illustrated in Fig. 6 at a larger scale, screw-threadedly engaged with threaded bores of the mantle portion 28. An engagement pin 40 of each of the buttons 39 is urged by a spring 41 in the direction of the arrow 42 so as to be engaged with an axial groove 43 of the piston member 27. At the extremity of the groove 43 associated with the bottom plate 35 there is a bore 44 for receiving the engagement pin 40 when the piston member 27 and the mantle portion 28 occupy their relative position wherein the volume of the chamber 25 has its minimum value. Referring to Fig. 7, the common kneading means has a kneading head 46 adapted to be displaced so as to be engaged with the individual receptacle means 26, 27, 28, 31. The head 46 is provided with movable kneading organs 45 adapted to be passed through the first passages 32 of the lid portion 26, 31 into the chamber 25 when the kneading head 46 is engaged with the individual receptacle means, drive means being provided for imparting rotational motion of the kneading head 46. The kneading head 46 is formed at the extremity of a kneading arm 47. On the inner side of a side wall 48 of the housing 20 there is a bearing (not shown) which supports a shaft 49 rotatably arranged therein and forming an extension of the kneading arm 47. The bearing is arranged so as to be axially displaceable on a closely fitting support. The shaft 49 has a drive disk 50 fixed to its free extremity and a flexible shaft connected therewith. The flexible shaft 51 is connected to the drive means of a revolution counter 54 the indication of which may be inspected through an aperture 53 provided in the front wall 52 of the apparatus. The axial position of the shaft 49 is rendered adjustable by means of an actuator 55 supported by means of the side wall 48 and having a common axle with an actuator 56 arranged on the opposite side of the side wall 48. The actuator 56 is provided with a shifting pin 57 which cooperates with the drive disk 50. By turning the actuator 55 in a clockwise direction as regards the drawing (Fig. 7), the system consisting of the components 45, 46, 47, 49, 50 is displaced by means of the shifting pin 57 in the direction of the arrow 58 shown in Fig. 7. The drive disk 50 is formed as a rope pulley or sheave and is connected by means of a drive rope 59 with a further rope pulley or sheave 62 arranged on a shaft 61 of an electric motor 60. The sheave 62 idles on the shaft 61 and cooperates with a half-disk 63 fixed to the shaft 61 in a manner shown in Figs. 8 and 9. Power transmission is obtained by means of a spring 64 which connects the sheave 62 to the half-disk 63. On the front surface of the sheave 62, left uncovered by the half-disk 63, there is a scale or graduation 65 for indicating the relative rotational movement of the sheave 62 and the half-disk 63. Thus, the sheave 62 and the half-disk 63 together with the spring 64 form an elastic coupling adapted to be used as a dynamometer, the driven part and the driver part of which are formed by the sheave 62 and the half-disk 63, respectively. Obviously, instead of the scale 65 other indicator means might be used as well. For example such other indicator means might be formed by an electric resistance the value of which is dependent on the relative displacement of the sheave 62 and the half-disk 63, or by an optical recording system adapted to represent and register, respectively, the relative displacement of the components 62 and 63 by means of projection.

Figures 10, 11:
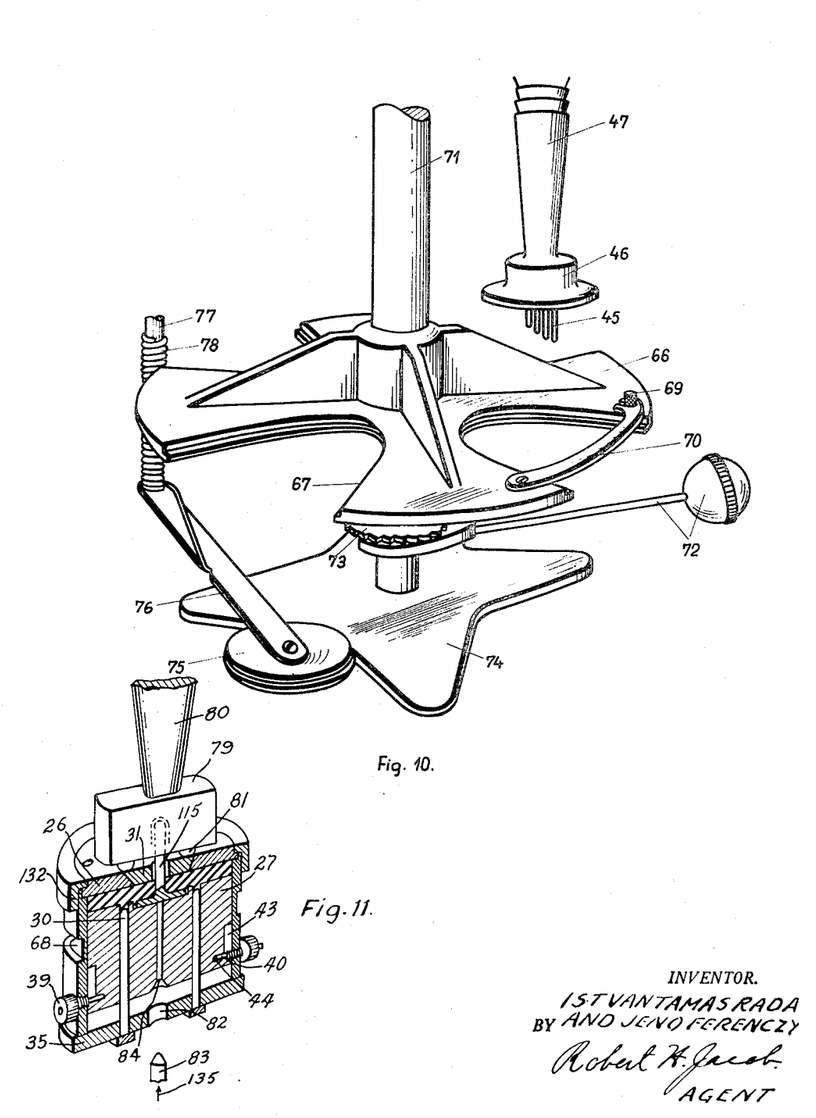
Fig. 10 shows a perspective view of the switch means for intermittently advancing the individual receptacle means.
Fig. 11 is a perspective view of a press means engaged with an individual receptacle means, with the latter shown in a sectional view.

As shown in Fig. 10, the apparatus is provided with a turn-table or conveyor 66 for supporting a plurality of the aforesaid individual receptacle means, actuating means being provided for intermittently rotating the turn-table 66 so as to advance the individual receptacle means according to a preselected value of angular rotation. As is obvious, particularly from Fig. 10, the turn-table 66 has, in the represented embodiment, four notches 67 adapted to be engaged with a circular groove 68 of the mantle portions 28. The individual receptacle means accommodated in the notches 67 are releasably fixed to the turn-table 66 by clamping means consisting of a latch 70 fixable by means of a screw 69 and pivotally arranged on the turn-table 66. For sake of clarity, Fig. 10 shows but one of the aforesaid latches 70. It is to be understood, however, that all of the notches 67 are provided with the clamping means 69, 70, as can be seen from Figs. 1 and 2. The axle 71 of the turn-table 66 supports a jack disk 73 operable by means of an actuator 72 which protrudes from the housing 20 of the apparatus. Furthermore, the axle 71 has a positioning star disk 74 attached to it for intermittently fixing the angular position of the turn-table 66. The star disk 74 cooperates with a roller 75 the periphery of which, e. g. covered with rubber, is running on the edge of the star disk 74. The roller 75 is supported by an arm 76 which, in turn, is journalled on a bracket 77 fixed to a base plate of the apparatus. A spring 78 slipped onto the bracket 77 urges the arm 76 so as to engage the roller 75 with the star disk 74. Thus, the disk 75 is constantly urged to occupy a position at the root of the arms of the star disk 74 and therby to automatically adjust the angular position of the turn-table 66.

In the path of the individual receptacle means between the kneading means and the hereinafter described tensile testing means a common press means, shown in Fig. 11, is arranged having a strut member 79 adapted to be abutted against the lid portion 26, 31 of the individual receptacle means, drive means being provided for advancing the piston member 27 towards the strut member 79. The strut member 79 is, in a not-represented manner, arranged on an axially displaceable arm 80, and bears by means of pins 81 against the bottom of suitable cavities in the insert 31 of the draw plate 26. In order to advance the piston member 27 towards the strut member 79, the bottom plate 35 is provided with a central aperture 82 through which a pressing bolt 83 can be passed into a central bore 84 of the piston member 27. The drive means is formed in a manner known per se and therefore not represented in the drawing. Its actuator is referred to by reference numeral 85 in Fig. 1.

Figure 12:
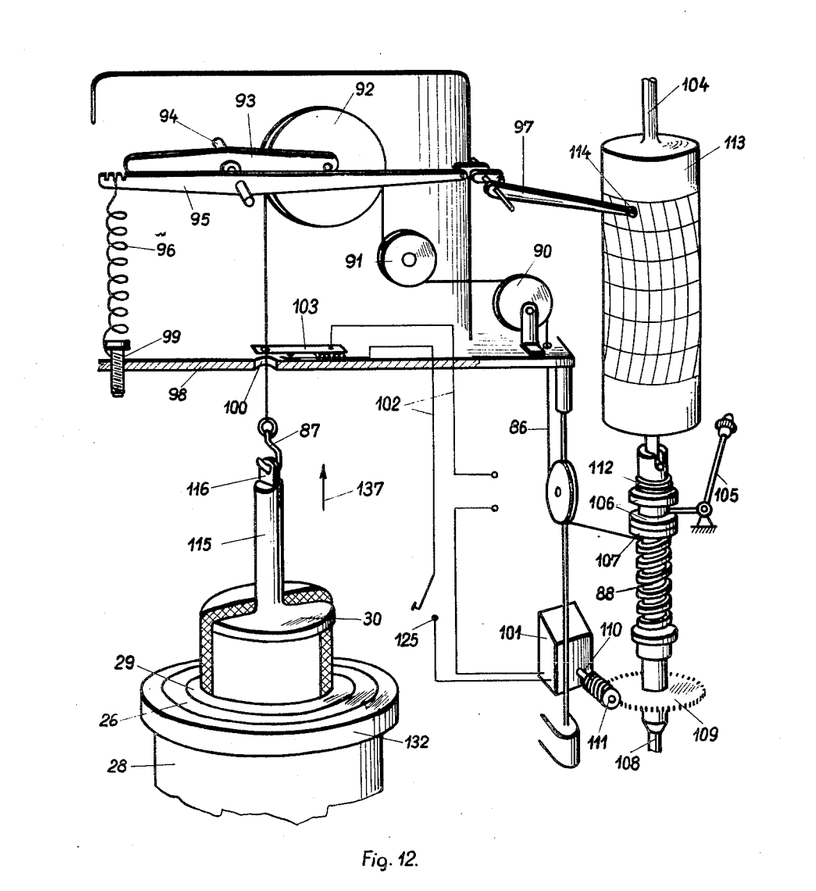
Fig. 12 is a perspective view of an embodiment of the common tensile testing means. Finally.

The details of the common tensile testing means of the apparatus are shown in Fig. 12. It has a drive means substantially consisting of a rope drive with which one extremity of a rope 86 has a tension hook 87 attached to it whereas its other extremity is wound on a threaded drum 88. The rope 86 is guided by means of rollers 89, 90, 91 and 92 supported by the frame of the apparatus. The roller 92 is supported by one arm of a double armed lever 93. The lever 93 has its axle 94 journalled in the frame of the apparatus. The axle 94 has another lever 95 fixed to it which is pivoted together with the lever 93, one of its extremities being acted upon by a spring 96 of adjustable tension, whereas its other extremity has a stylus 97 of a recording means attached to it. The setting of the spring 96 is rendered adjustable by means of a setting screw 99 which is in threaded engagement with a transversal plate 98 forming a portion of the frame of the apparatus. The plate 98 has a passage 100 for the passing of the rope 86, the passage 100 being selected so as to permit the hook 87 connected to the rope 86 to be passed through the passage 100 and abutted against one contact arm of a switch 103. Said switch is inserted into an electric circuit 102 comprising an electric motor 101 for driving the common tensile testing means. The hook 87 thereby interrupts the circuit 102 of the electric motor 101 so as to automatically stop the drive means after the test specimen has been broken and an interruption of the circuit 102 otherwise has not been taken care of.

The threaded drum 88 is arranged on an axle 104 supported by the frame of the apparatus. Below the drum 88 the axle 104 has a driver part 106 of a shaft coupling on it arranged so as to be axially shiftable, the driver part 106 being operable by an actuator 105 which protrudes from the side wall 48 of the apparatus. The driven part 107 of the aforesaid shaft coupling idles on an axle 108 arranged in alignment with the axle 104. The axle 108 is by means of a pinion 109 engaging a worm 111 driven by the electric motor 101 by means of its shaft 110. The engagement of the parts of the shaft coupling 106, 107 is effected by a spring 112 slipped onto the axle 104 and inserted between the upper brim of the coupling part 106 and a not represented portion of the frame of the apparatus. Furthermore, the axle 104 has a drum 113 arranged on it, the drum 113 being adapted to have a record tape fixed to it. The stylus 97 is arranged so that its point 114 is adapted to be moved along the peripheral surface of the drum 113.

The individual tension head means 30 has a shank 115, the extremity of which is provided with a loop 116 adapted to be engaged with the hook 87. Obviously, the counter-part of the tensile testing means is formed by the individual receptacle means 26, 27, 28, 31. While kneading and pressing, respectively, the shank 115 occupies a position within an aperture 117 of the insert 31 and in an axial bore 118 of the kneading head 46 as well as in a similar bore of the strut member 79, represented with dotted lines in Fig. 11.

The apparatus includes a preheating chamber which may be closed by means of a lid 120 arranged on a side wall 119 of the apparatus, and in which receptacles containing the specimens of the flour to be tested and the water needed for the kneading, respectively, are stored. Furthermore, the apparatus is provided with temperature regulating means consisting of a heating unit 121, a contact temperature meter 122 and a not represented thermostatic switch means known per se. By this device the temperature of both the chamber 24 and the preheating chamber closed by the lid 120 is maintained at a preselected value.

Figure 13:
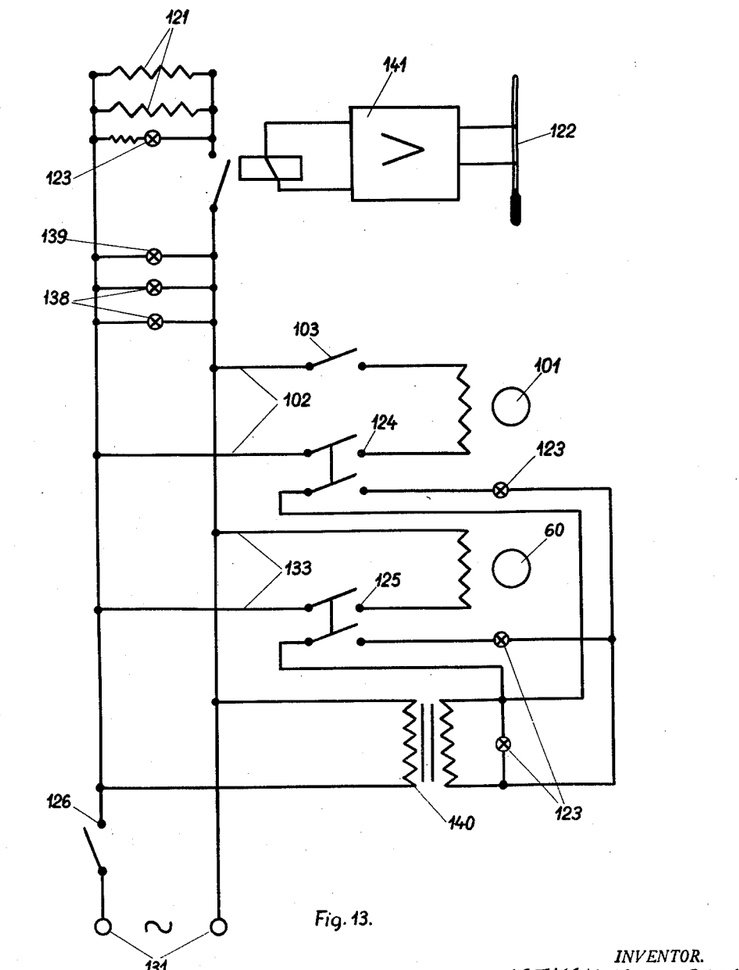
Fig. 13 is a block diagram of the electric circuit of the apparatus.

On the front surface of the apparatus there are signal lamps 123 indicating the switching in of the apparatus proper, the heating means, the common kneading means and the common tensile testing means, respectively. Likewise, there are switches 124 and 125 of the electric motors 60 and 101 of the kneading means and the tensile testing means, respectively, as well as a switch 126 for connecting the entire electric equipment of the apparatus to the mains of a supply net. The side wall 48 of the apparatus has two further lids 127 and 128 releasably fixed to it as is the case with the lid 120. A window 128 of the lid 127 permits inspection of the chart fixed to the drum 113. A slot 130 provided in the lid 127 is arranged to guide the chart while uncoiling from the drum 113. The uncoiled portion of the chart which protrudes from the slot 130 can be torn off by means of an indentation provided on the edge of the slot 130. The common tensile testing means is rendered accessible by removing the lid 128. A connector 131 shown in Fig. 13 serves for connecting the apparatus to a supply net. Glow lamps 138 and 139 illuminate the interior of the apparatus and the chart bearing drum 113. Reference numerals 140 and 141 refer to a reducing transformer and a relay, respectively.

In operation, the switch 126 is closed after the apparatus has been connected to the supply net. Thereby the glow lamps 138 and 139 illuminate the interior of the apparatus and the chart bearing drum 113, respectively, and the heating means of the apparatus is switched in and adjusted so as to maintain a temperature of about 30° centigrade in both the test chamber 24 and the preheating chamber closed by the lid 120. Test specimens of the flour to be tested are placed in storage receptacles which are, in turn, accommodated in the preheating chamber. The water needed for preparing the test specimens is handled in a like manner. The lid portion 26, 31 of a first individual receptacle means 26, 27, 28, 31 is removed and the piston member 27 thereof is set so as to occupy its bottom position associated with the maximum volume of the chamber, in which position the pins 40 of the buttons 39 bear against the upper extremity of the grooves 43 as shown in Fig. 4. An amount of 15 grams of flour and 7.5 milliliters of water, respectively, preheated to a temperature of about 30° centigrade in the storage receptacles, is transferred into the chamber 25 of the individual receptacle means, whereafter the lid portion 26, 31 thereof is placed upon the mantle portion 28 and fixed in its position by a clamping ring 132 illustrated in Figs. 4 and 11. The bottom plate 35 is placed so as to bear against the receptacle means from below and the set bolts 36 are pushed upwards till their heads 37 bear against the bottom surface of the bottom plate 35. By the close fitting of the bolts 36 and the rubber inserts 38 the position of the bottom plate 35 is duly fixed. The individual receptacle means 26, 27, 28, 31 thus assembled is placed into one of the notches 67 of the turn-table 66, the latch 70 is engaged with the screw 69 and the latter tightened. The turn-table 66 is by means of swinging the arm 72 brought into a position wherein the individual receptacle means prepared for kneading is in alignment with the kneading head 45 of the common kneading means. By means of the switch 124 the electric circuit 123 of the electric motor 60 is closed whereby the kneading head 46 is set in rotation. The actuator 55 is turned in the clockwise direction into its position represented by dotted lines in Fig. 7 whereby the kneading head 46 is displaced in the direction of the arrow 56 and becomes engaged with the individual receptacle means fixed to the turn-table 66. As soon as the kneading organs 45 of the kneading head 46 register with the passages 32 of the draw plate 26 and the insert 31 thereof, the kneading head 46 is further advanced in the direction of the arrow 58 whereby the kneading organs 45 penetrate through the passages 32 into the chamber 25. In this relative position of the kneading head 46 and the individual receptacle means 26, 27, 28, 31 the bottom surface of the former bears against the top surface of the latter.

The kneading process then begins and is continued to a preselected number of revolutions, which is registered by the revolution counter 54, as may be inspected through the aperture 53 of the front wall 52 of the apparatus. The actual effect of the kneading process can be inspected by means of the scale 65 of the dynamometer 62, 63 through an aperture or window 134 of the top wall of the apparatus.

With the kneading process going on, a further or second individual receptacle means is prepared in the above described manner and accommodated in the next notch 67 of the turn-table 66 as described above.

After the kneading process in the first individual receptacle means has been continued for the preselected number of revolutions, the electric motor 60 is stopped by means of the switch 124 and the kneading head 46 is, by turning the actuator 55 in the counter-clockwise direction, reset into its original position illustrated by solid lines in Fig. 7. The kneading organs 45 emerge from the chamber 25 thereby, so that the turn-table 66 may be turned by means of the actuator 72 by one graduation, i. e. with the represented embodiment, by an angular amount of 90°. By turning the turn-table 66 the first individual receptacle means containing the kneaded dough is advanced in between the strut member 79 and the press bolt 83 and the newly inserted second individual receptacle means arrives below the kneading head 46. The second individual receptacle means prepared for the kneading process is engaged with the common kneading means in the above described manner and the kneading process started. The first individual receptacle means containing the kneaded dough is, in turn, engaged with the common press means. The pressing bolt 83 is pushed upwards in the direction of an arrow 135 in Fig. 11 so as to advance the piston member 27 towards the strut member 79. The upward motion of the piston member 27 is continued till the pins 40 of the buttons 39 reach the extremities of the grooves 43 and snap into the bores 44. Thus, the dough present in the chamber 25 is being pressed to a predetermined extent, surplus dough driven out through special apertures 136 of the draw plate 26. Thereafter the specimen is allowed to rest for awhile.

With these processes going on, a still further or third individual receptacle means is prepared and fixed in the next notch 67 of the turn-table 66 in the above described manner. After having finished the kneading process of the test specimen contained by the second individual receptacle means, the turn-table 66 is again rotated by an angular amount of 90° whereby the first individual receptacle means is advanced to the common tensile testing means, the second individual receptacle means arrives at the common press means and the third individual receptacle means comes to the common kneading means. Thus, in this position of the turn-table 66, the tensile test of the test specimen contained in the first individual receptacle means may be carried out. The coupling 106, 107 of the tensile testing means is disconnected by means of the actuator 105 and the tension hook 67 drawn down whereby the drum 88 is idly running on the axle 108. The hook 87 is engaged with the tension head means 30 by means of the loop 116 of its shank 115 protruding from the lid portion 26, 31 of the first individual receptacle means. Thereafter the coupling 106, 107 is again actuated and by means of the switch 125 the circuit 102 of the electric motor 101 closed so that the drive means of the common tensile testing means is started. The rope 86 is wound onto the drum 88 and exerts a tensile force on the tension head means 30 in the direction of an arrow 137 shown in Fig. 12. By the tensile force the tension head means 30 is lifted from its seat in the piston member 27 and pushes the dough through the draw hole 29 of the draw plate 26. Upon the action of the force needed for drawing the dough through the draw hole 29 the lever system 93, 94, 95 is pivoted till the increasing force of the spring 96 is balanced by the tensile force. The equilibrium obtained during the tensile test of the dough alters according to the resistance of the dough so that the point 114 of the stylus 97 operated by the lever system 93, 94, 95 describes a curve on the chart fixed to the drum 113 in accordance with the alteration of the tensile force. The rotation of the drum 113 being proportional to the path covered by the tension head means 30 in the direction of the arrow 137, the recording means 112, 113, 114 plots the alteration of the tensile force in dependence on the path. The tensile test is continued till the dough breaks in consequence of being drawn through the draw hole 29. Then the electric motor 101 is stopped by means of the switch 125, the tension head means lifted off the hook 87 and the first individual receptacle means, after releasing the clamping means 69, 70, removed from the notch 67 of the turn-table 66. The chart attached to and withdrawing from the drum 113 through the aperture 130 of the lid 127 of the apparatus will be drawn by hand till the plotted curve appears outside of the apparatus whereafter it is torn off by means of the indentation of the slot 130. If the switch 125 has, by chance, not been put out of the circuit, the hook 87 will in the course of its further displacement through the aperture 100 of the plate 98 abut against the arm of the switch 103 and thereby interrupt the circuit 102 of the electric motor 101 so that the latter will automatically be stopped.

The removed first individual receptacle means will be disassembled after screwing out the buttons 39 and cleansed whereafter it can be made use of in the aforesaid manner if desired.

With the tensile testing process going on a further or fourth individual receptacle means can be prepared and inserted in the next notch 67 of the turn-table 66 as has been described above. After the turn-table 66 has been rotated by a further angle of 90° by means of the actuator 72, the kneading, pressing and tensile testing processes, respectively, will be carried out each with respect to the fourth, third and second individual receptacle means, respectively, which means a serial testing of the flours to be tested.

Obviously, with the test performed by the inventive apparatus, on one hand, a serial testing is rendered possible and, on the other hand, manual manipulation of the test specimens is obviated. At the same time, a constant temperature is maintained and the uniformity of the kneading, pressing, resting and tensile testing processes, respectively, is assured. Thus, the test results obtained by the apparatus constitute readily comparable values which may be exactly evaluated as regards the quality of the material being tested.

What we claim is:

1. Apparatus for serially testing materials which may be rendered jelly-like by kneading comprising a conveyor having means for receiving and retaining sample holding receptacles; said receptacles including a cup member enclosing a kneading chamber, a closure disc having a centrally disposed opening and rotatable with respect to said cup, a plate normally arranged at the bottom of the kneading chamber and having a stem projecting upwardly through the opening in said closure disc; a kneading station disposed along the path of the conveyor including a vertically disposed rotatable shaft mounted for axial movement toward the conveyor; a kneading head carried by said shaft including a plurality of pins adapted to enter the cup member for kneading the contents thereof; and a test station disposed along the conveyor in spaced relation to the kneading station, said test station including a pull member engageable with the aforesaid stem and a force measuring means for measuring the force necessary to pull said plate through the opening in the closure disc.

2. Apparatus for serially testing materials which may be rendered jelly-like by kneading comprising a conveyor having means for receiving and retaining sample holding receptacles; said receptacles including a sleeve member enclosing a kneading chamber, a closure disc for the top of said chamber having a centrally disposed opening and rotatable with respect to said sleeve, a plate normally arranged at the bottom of the kneading chamber and having a stem projecting upwardly through the opening in said closure disc; a piston disposed for axial displacement within said sleeve, the top surface of said piston forming the lower surface of said chamber; a kneading station disposed along the path of the conveyor including a vertically disposed rotatable shaft mounted for axial movement toward the conveyor; a kneading head carried by said shaft including a plurality of pins adapted to enter the cup member for kneading the contents thereof; and a test station disposed along the conveyor in spaced relation to the kneading station, said test station including a pull member engageable with the aforesaid stem and a force measuring means for measuring the force necessary to pull said plate through the opening in the closure disc.

3. Apparatus for serially testing materials which may be rendered jelly-like by kneading comprising a conveyor having means for receiving and retaining sample holding receptacles; said receptacles including a sleeve member enclosing a kneading chamber, a closure disc for the top of said chamber having a centrally disposed opening and rotatable with respect to said sleeve, a plate normally arranged at the bottom of the kneading chamber and having a stem projecting upwardly through the opening in said closure disc; a piston disposed for axial displacement within said sleeve, the top surface of said piston forming the lower surface of said chamber; a kneading station disposed along the path of the conveyor including a vertically disposed rotatable shaft mounted for axial movement toward the conveyor; a kneading head carried by said shaft including a plurality of pins adapted to enter the cup member for kneading the contents thereof; a compression station disposed along the conveyor in spaced relation to the kneading station, said compression station including a ram axially displaceable to move said piston and reduce the volume of the aforesaid chamber; and a test station disposed along the conveyor in spaced relation to the compression station, said test station including a pull member engageable with the aforesaid stem and a force measuring means for measuring the force necessary to pull said plate through the opening in the closure disc.

4. Apparatus for serially testing materials which may be rendered jelly-like by kneading comprising a conveyor having means for receiving and retaining sample holding receptacles; said receptacles including a cup member enclosing a kneading chamber, a closure disc having a centrally disposed opening and rotatable with respect to said cup, a plate normally arranged at the bottom of the kneading chamber and having a stem projecting upwardly through the opening in said closure disc and stationary kneading pins arranged to project upwardly into the kneading chamber from the lower portion thereof; a kneading station disposed along the path of the conveyor including a vertically disposed rotatable shaft mounted for axial movement toward the conveyor; a kneading head carried by said shaft including a plurality of pins adapted to enter the cup member from the upper portion thereof and to cooperate with the aforesaid fixed pins to knead the contents thereof; and a test station disposed along the conveyor in spaced relation to the kneading station, said test station including a pull member engageable with the aforesaid stem and a force measuring means for measuring the force necessary to pull said plate through the opening in the closure disc.

5. Apparatus for serially testing materials which may be rendered jelly-like by kneading comprising a conveyor having means for receiving and retaining sample holding receptacles; said receptacles including a sleeve member enclosing a kneading chamber, a closure disc for the top of said chamber having a centrally disposed opening and rotatable with respect to said sleeve, a plate normally arranged at the bottom of the kneading chamber and having a stem projecting upwardly through the opening in said closure disc; a piston disposed for axial displacement within said sleeve, the top surface of said piston forming the lower surface of said chamber, and a closure plate for the bottom of said sleeve member, said closure plate being removably retained by pins projecting therethrough into resilient inserts in the lower portion of the piston member; a kneading station disposed along the path of the conveyor including a vertically disposed rotatable shaft mounted for axial movement toward the conveyor; a kneading head carried by said shaft including a plurality of pins adapted to enter the cup member for kneading the contents thereof; and a test station disposed along the conveyor in spaced relation to the kneading station, said test station including a pull member engageable with the aforesaid stem and a force measuring means for measuring the force necessary to pull said plate through the opening in the closure disc.

6. Apparatus for serially testing materials which may be rendered jelly-like by kneading comprising a conveyor having means for receiving and retaining sample holding receptacles; said receptacles including a cup member enclosing a kneading chamber, a closure disc having a centrally disposed opening and rotatable with respect to said cup, a plate normally arranged at the bottom of the kneading chamber and having a stem projecting upwardly through the opening in said closure disc; a kneading station disposed along the path of the conveyor including a vertically disposed rotatable shaft mounted for axial movement toward the conveyor; a kneading head carried by said shaft including a plurality of pins adapted to enter the cup member for kneading the contents thereof; and a test station disposed along the conveyor in spaced relation to the kneading station, said test station including a pull member engageable with the aforesaid stem and a force measuring means for measuring the force necessary to pull said plate through the opening in the closure disc; means for advancing said conveyor, and means arranged to stop the conveyor with the receptacles arranged in position to receive the aforesaid kneading head and pull member.

7. Apparatus for serially testing materials which may be rendered jelly-like by kneading comprising a conveyor having means for receiving and retaining sample holding receptacles; said receptacles including a cup member enclosing a kneading chamber, a closure disc having a centrally disposed opening and rotatable with respect to said cup, a plate normally arranged at the bottom of the kneading chamber and having a stem projecting upwardly through the opening in said closure disc; a kneading station disposed along the path of the conveyor including a vertically disposed rotatable shaft mounted for axial movement toward the conveyor; a kneading head carried by said shaft including a plurality of pins adapted to enter the cup member for kneading the contents thereof; and a test station disposed along the conveyor in spaced relation to the kneading station, said test station including a pull member engageable with the aforesaid stem and a force measuring means including a stylus and chart arranged to sense the force applied to the pull member and to measure and record the force necessary to pull said plate through the opening in the closure disc.

References Cited in the file of this patent

UNITED STATES PATENTS

| 235,164 | Mather | Dec. 7, 1880 |
| 1,334,395 | Patterson | March 23, 1920 |

FOREIGN PATENTS

| 274,281 | Switzerland | June 16, 1951 |